United States Patent [19]
Naegele et al.

[11] 3,756,610
[45] Sept. 4, 1973

[54] TAPE TRAVEL GUIDING APPARATUS

[75] Inventors: Erich O. Naegele, Herkimer; Richard J. Petkovsek, Middleville; Torkjell Sekse, Utica; Ernesto G. Sevilla, Herkimer, all of N.Y.

[73] Assignee: Cogar Corporation, Wappingers Falls, N.Y.

[22] Filed: Jan. 8, 1971

[21] Appl. No.: 104,934

[52] U.S. Cl. .......... 274/4 R
[51] Int. Cl. .......... G11b 15/60
[58] Field of Search .......... 226/196; 274/4 R, 274/4 D; 242/76

[56] References Cited

UNITED STATES PATENTS 2,821,575 1/1958 Dale .......... 179/100.2 R

FOREIGN PATENTS OR APPLICATIONS 960,828 6/1964 Great Britain .......... 226/196
1,166,714 6/1958 France .......... 274/4 R

*Primary Examiner*—Harry N. Haroian
*Attorney*—Gottlieb, Rackman & Reisman and Harry M. Weiss

[57] ABSTRACT

A dual guide post arrangement for guiding recording tape past the read and write heads on a tape deck. A pair of stationary non-rotating posts is arrayed on at least one side of the tape deck heads; such a post pair guides the tape in its travel between the heads and the supply or take-up reel. Each post which is farthest from the heads includes an upper shoulder limiting the sliding movement of the tape in an upward direction, but which would permit unlimited downward movement. However, the other post of each pair, which is nearest the heads, controls such downward movement and provides ultimate control over alignment of the tape and the heads by including a lower flange. The surface of the lower flange is at a level relative to the effective portions of the heads such that the tape will be correctly guided across the heads.

While a pair of posts may be used on each side of the heads, an alternate version provides for a pair of guide posts on only one side of the read and write heads, with a single guide post on the other side of the heads. The provision of a single post between the read head and the capstan permits more uniform speed control of the tape as it is pulled across the head by the capstan, while retaining the advantage of the two guide posts on the other side of the read and write heads.

14 Claims, 5 Drawing Figures

PATENTED SEP 4 1973

3,756,610

INVENTORS
ERIC O. NAEGELE
RICHARD J. PETKOVSEK
TORKJELL SEKSE
ERNESTO G. SEVILLA

BY Gottlieb, Rackman & Reisman
Harry M. Weiss
ATTORNEYS

TAPE TRAVEL GUIDING APPARATUS

This invention relates to tape guiding, and more particularly, to apparatus for accurately controlling the orientation of fast-moving recording tape to position such tape properly with respect to the operative heads of the tape deck.

The use of a wide variety of recording media has become increasingly widespread of late. Such use has proliferated recently on an even more accelerated basis due to the great demands of both the data processing industry and the consumer-oriented recording market.

Of the recording media in current use, magnetic recording tape is utilized in a large proportion of applications, due in part to its versatility for recording and erasing functions, its general ease of storage and access, and its capability of handling the necessary high speeds of movement. For example, in many of the existing and even newer lines of data processing hardware, magnetic recording tape is relied on for handling all the data requirements of the system. But these newer systems have placed great demands on the capacity of recording tape to accomodate the high concentrations of data, together with the greater speeds of motion required to keep pace with the large quantities of information sought to be written, stored, read out and in some instances, selectively erased. Accordingly, it has become of increasing importance not only to develop tape having characteristics which will accept high data concentrations, but also to insure the accurate travel of such tape with respect to the read and write heads in a tape system.

The need for this degree of accuracy, which the prior art has not been able to comply with consistently, can best be demonstrated in connection with a specific but typical example. Thus, in a high speed data processing system including tape as the recording medium, it may be desired to have a data concentration of as much as 1600 bits per inch. Where such concentrations of data are involved, a slight angular change of alignment of the tape between write and read operations can result in the recorded data being skewed relative to the gap in the read head. This results in poor signal definition and can cause significant data errors. If the tape is not guided past a write head in the correct orientation, some "skew" will be present during the write cycle, and the attendant flux changes may cause apparently erroneous data entries when attempts are made to recover the data. During the read cycle, tape "skew" with respect to the read head can similarly lead to an incorrect read-out.

The solutions to this problem offered by the prior art have been of some complexity and have not been fully equal to the task. Most tape systems utilize some form of stationary posts to guide the tape to and from the read and write heads. In the common tape recorder used in many homes, a single cylindrical guide post is used, with a recess or cut-out in its outer periphery to accommodate the travelling tape element. The width (i.e., height) of the cut-out is almost precisely equal to the width of the tape, thus making the alignment of the tape and the guide post cut-out quite critical. This type of fixed guide system even using two such posts as is often done, is not adequate for the high concentrations of data referred to above, since the tape frequently tends to curl towards the horizontal surface along either the top or bottom flange of the cut-out, and this curling leads to poor skew control, and hence to data errors as previously noted. One suggested prior art technique for making the laterally fixed guides axially rotatable has not significantly reduced the number of errors created as a result of this problem.

Since one of the main difficulties with fixed guides is their inability to allow for any tape movement in the axial direction without leading to immediate data errors, the data recording art has come forward with a guide comprising one fixed and one spring-biased movable flange, together defining a recess or cut-out. The "normal" dimension between the two inner flange surfaces is slightly less than the width of the tape, and the tape normally rides in the guide slot with one edge against the inner surface of the spring-biased flange (which may take the form of a washer) which slides on a pin to accommodate the slight deviations from correct axial alignment, thus avoiding the curling effect. The "solution" of providing a spring-loaded washer to act as a flange often brings more problems than it eliminates — the flange's aperture can easily become clogged with dirt or some particles of the tape's magnetic coating. Since the washer-flange, once assembled, is difficult if not impossible to clean or lubricate, such an arrangement, although used in some sophisticated data processing systems has led to maintenance difficulties.

Besides using other guide post geometries (e.g., partially conical), the prior art also utilizes specific circuitry to attempt to electronically correct the problems created by the lack of tape alignment. In such "skew correcting" circuits where multiple channels of data are involved, it is possible to correct for timing errors ( e.g., by comparison between channels, or with a master timing signal), but it is generally not possible to correct a signal the intensity of which is either too low or even totally missing due to excessive skew. If the tape skew has caused a magnetic signal to be recorded on the tape at too low a recording intensity, external circuitry cannot selectively improve the integrity of the signal. Finally, it is recognized that a better overall approach would be to try to avoid such data errors in the first instance, thus eliminating the need for additional circuits and the delay required to permit such circuits to perform their limited correcting functions.

It is therefore an object of this invention to obviate one or more of the aforesaid difficulties.

It is also an object of this invention to improve the reliability of data processing systems which use tape as the recording medium.

It is a further object of this invention to properly align recording tape with respect to both read and write heads on a continuing basis during tape travel.

It is still another object of this invention to eliminate data errors resulting from deviations in tape travel from an acceptable guide path.

It is still further object of this invention to accurately guide an element of recording tape past the recording and playback heads of a tape deck with only fixed guide posts and no external electronics.

The foregoing objects, as well as further features and advantages of this invention can be better understood in connection with the description of a particular illustrative embobiment of the invention. A tape deck which operates by passing magnetic recording tape from a supply reel or cartridge to a take-up reel is disclosed. In the path of movement of the tape between the supply cartridge and the take-up reel are a first pair of stationary non-rotatable guide posts, the write and read (i.e., record and playback) heads and a second pair of comparable non-rotatable guide posts. (An alternate embodiment of the invention, to be described below, utilizes a single guide post, with upper and lower flanges, on one side of the heads, with a pair of guide posts as described herein on the other side of the heads.) in addition, between one pair of such guide posts and the take-up reel is a friction capstan which controls the speed and direction of motion of the tape. Each individual guide post serves to complement its adjacent guide post in aligning the tape with respect to the tape heads. For purposes of this general introduction, the description with respect to one such pair of guide posts will be sufficient.

Specifically, considering a pair of guide posts located between the supply cartridge and the write head, the outermost guide post (i.e., the one closest to the supply cartridge) has generally a T-shape cross-section, with a main cylindrical post rising into a larger upper cylinder forming a surrounding shoulder or flange. Tape travelling past this guide post and towards the write head is free to move in a vertical direction, sliding along the main central shaft, until it comes into contact with the surrounding upper flange. The contact between the upper edge of the tape and the lower inner surface of the surrounding flange of the post serves to limit the direction of upward movement of the tape. Accordingly, based on this first guide post, there can be some deviation of vertical tape orientation in the downward direction, but deviation upwardly is restricted by the presence of the upper shoulder.

The second guide post (the one closest to the write head) has what might be termed an "inverse" construction to the first one, namely, it has a free standing upper shaft portion, with a lower surrounding flange. The relevant portion of this guide post can be considered to have the cross section of an inverted T and thus provides a limitation on the sliding excursion of the tape in a downward direction. On the other hand, this second guide post has no structural limitation on the upper sliding tape motion referred to previously. Since the two guide posts are closely adjacent to each other, however, the upper limiting flange on the first guide post and the lower limiting flange on the second guide post act in tandem to provide an overall limitation on the axial deviational motion of the tape as it travels towards the write head. Relative to an undeflected tape, there is actually an "interference" between the flanges and the tape. This interference constrains the tape to act as a spring, which, due to the tension in the tape, causes the two posts and the tape to act like a spring-loaded guide. In particular, the two guide posts, considered together, serve to provide both upper and lower surfaces for guiding the tape; however, by providing such guide surfaces on separate guide posts, this invention avoids the problems which have plagued the prior art.

In actual practice, the first or outermost guide post, in receiving the upper edge of the tape in contact with the lower surface of the upper flange, acts to force the tape slightly downwardly. Then, when the tape having this slight bias reaches the second innermost guide post, the tape's vertical motion downwardly is limited and stopped by the contact between the lower edge of the tape and the upper surface of the lower flange on that second guide post. In being so limited, the tape essentially "springs" downward into contact with the lower flange of the second guide post and accordingly, exhibits a very slight lateral deflection. However, the distance between the second guide post and the write head in the path of travel of the tape is sufficiently long such that the tape tension in the system keeps the data-bearing portion of the tape against the heads.

In this construction, therefore, the first outermost guide post acts as a "preliminary" guide to generally align the tape. The significant final control with respect to aligning the tape from the guide posts with the write head is accomplished by means of the second guide post. The upper surface of the lower flange on the second guide post is aligned with the write head in a manner to insure that if the tape is properly aligned with that controlling flange surface in the tape guide path, then the tape will also be aligned properly with the effective portion of the write head.

The overall result of the two guide posts operating to complement each other is that the first guide post, with its upper flange, acts to generally align the vertical orientation of the tape and to give a "coarse" alignment. The second guide post, with its lower flange coming into contact with the lower edge of the tape, serves to give the "fine" alignment and passes the now aligned tape on to the write head.

It is therefore a feature of an embodiment of this invention that a pair of stationary guide posts is utilized on at least one side of the recording heads to insure accurate travel of record tape past the heads.

It is also a feature of an embodiment of this invention that complementing guide flanges on adjacent guide posts serve to guide and align recording tape to and from the heads, with the configuration of the posts and the tape tension of the system acting as a "spring-loaded" guide with respect to the tape.

It is another feature of an embodiment of this invention that one guide post of a pair of such guide posts includes a flange to limit tape deviation in one direction, while the adjacent post of the same pair includes a flange to limit tape deviation in the opposite direction.

It is a further feature of an embodiment of this invention that one of a pair of tape guide posts complements the other post of that same pair with respect to aligning tape moving toward or away from the recording heads of a tape deck.

It is yet another feature of an embodiment of this invention that a pair of complementing one-flange guide posts is arrayed on one side of a tape deck's recording heads, while a single two-flange guide post is located on the other side of the heads, all to achieve proper alignment of the tape with respect to the heads.

Additional objects, features and advantages of the present invention will become apparent when taken in conjunction with a presently preferred, but nonetheless illustrative, embodiment of the invention as explained in the following detailed description and as shown in the accompanying drawing, wherein.

Figure 1:
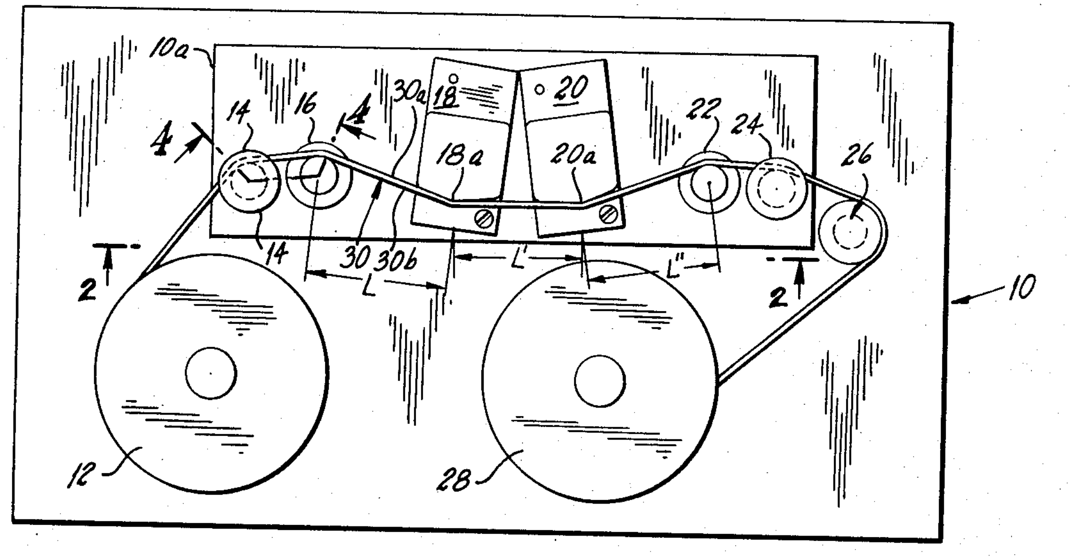
FIG. 1 is a plan view of a tape deck incorporating the present invention.

In FIG. 1, there appears a plan view of a tape deck 10 incorporating the present invention, wherein the upper surface of the tape deck includes a supply assemby 12, which may take the form of any one of a variety of tape supply mechanisms, such as open reels, cassettes or cartridges, with self-threading features if desired—all of these may be used together with the present invention. Plate 10*a* is fixed to the center of tape deck 10 and has mounted thereon a first pair of stationary tape guide posts 14, 16 on one side of active recording heads 18 and 20, and another such pair of guide posts 22, 24 on the other side of the recording heads. It is also noted that the left hand pair of posts 14, 16 is positioned between supply reel assembly 12 and heads 18, 20, while the other pair of guide posts 22, 24 is positioned between heads 18, 20 and friction capstan 26 (or other suitable driving means e.g., pinch rollers or the like); the forward tape travel path continues past capstan 26 to take-up assembly 28, which may also assume the form of any one of a variety of structures for tape winding (e.g., see the dual hub take-up reel disclosed in copending application Ser. No. 104,933, filed Jan. 8, 1971, entitled Tape Cartridge Loading and Positioning System and assigned to the assignee of the present application).

The tape travel path between supply assembly 12 and take-up assembly 28 is defined in FIG. 1 by the presence of recording tape 30 which can also represent the initial position of a tape leader which may be permanently associated with take-up assembly 28. For example, the use of a leader hook or clasp (not shown) attached to the end of the leader can couple the leader with the recording tape after the supply reel has been loaded with the recording tape — the leader clasp will then traverse the tape travel path indicated by tape 30 in FIG. 1, the clasp itself ultimately being stored in a suitable receptacle therefore within take-up assembly 28 as described in the aforesaid copending application.

Figure 2:
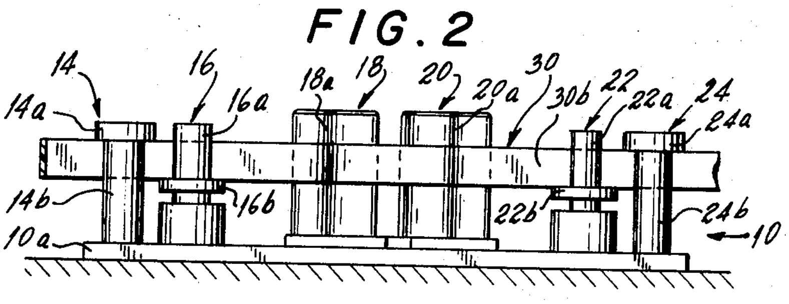
FIG. 2 is a front view of a portion of the tape deck shown in FIG. 1, illustrating the relationship between the guide posts and the heads.

Considering the plan view of FIG. 1 and the front view of FIG. 2, tape 30 is seen to pass behind both pairs of guide posts 14, 16 and 22, 24, thus serving to positively press tape 30 across the effective portions 18*a* and 20*a* of heads 18 and 20 respectively. (Illustratively, head 18 may be the write head, while head 20 can be the read head, although it is possible for the system to have the head positions interchanged.) As can be seen from the plan view of FIG. 1, the positions of guide post pairs 14, 16 and 22, 24 are set back somewhat from the front surfaces of heads 18 and 20, thus compelling tape 30 to assume the position shown in FIG. 1 wherein operative portion 18a of head 18 is in intimate contact with tape 30 as it passes by write head 18; similarly, the tape is in intimate contact with pick-up portion 20*a* of read head 20 by virtue of the post and head geometry. It is also noted from FIG. 1 that the effective tape surface 30*a* (i.e., the magnetic oxide coated surface) which comes into contact with head regions 18a and 20a is touched only at those head areas — no portion of the magnetic oxide coated surface 30*a* of tape 30 is contacted by any other mechanical member between supply reel 12 and take-up reel 28, with all physical contacts being with the non-magnetic surface 30*b* of tape 30. This serves to eliminate any possible contamination of tape 30 during tape travel and also serves to insure the total preservation of all data contained on tape 30.

Figure 3A:
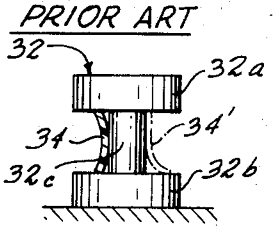
FIG. 3A PRIOR ART
FIG. 3A is a side view of one version of a prior art tape guide.

The use of the guide posts of the present invention eliminates several problems associated with prior art tape guiding apparatus. One form of such prior art tape guide is illustrated in FIG. 3A, wherein a fixed I-shaped guide post 32 is illustrated. Guide post 32 includes an upper, generally circular, flange 32*a* connected to a similar lower flange 32*b* by central shaft 32*c*. The distance between the lower surface of flange 32*a* and the upper surface of flange 32*b* is just slightly less than the width of tape 34 which is to be guided by guide post 32. Accordingly, the normal orientation of tape 34 with respect to guide 32 is that shown in somewhat exaggerated fashion to the left of shaft 32*c*, namely with the upper and lower edges of tape 34 slightly "curled" as the tape passes through guide post 32, for example on its way to the head in a typical prior art tape deck (not shown). Assuming that the first head which tape 34 of prior art tape guide post 32 reaches after leaving the guide post is a write head, it may well be that some part of the curl of tape 34 shown in FIG. 3A will still be present as tape 34 passes by such write head. This will cause at least some portion of the surface of tape 34 to be separated from the effective portion of the write head, thus raising the distinct possibility that some data will not be properly recorded on tape 34. Similarly, it is possible that tape 34 will assume the orientation illustrated at phantom position 34' in FIG. 3A. Thus, while the upper edge of tape 34' has become properly aligned with the lower surface of upper flange 32*a*, the lower edge of tape 34' has assumed an even greater curl than that illustrated at 34, and has commenced to curl out against the horizontal upper surface of flange 32*b*. This degree of curl is totally unsatisfactory, since some erroneous data entries will almost invariably take place where the curl illustrated at 34' in FIG. 3A is not overcome by some external means (e.g., separate circuitry or additional mechanical devices) before the tape arrives at the write heads. The operation of the read head can also be adversely affected, by data not being picked up as the curled tape moves past the head.

Figure 3B:
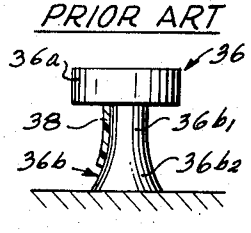
FIG. 3B PRIOR ART
FIG. 3B is a side view of a second version of a prior art tape guide.

Another somewhat unsatisfactory prior art device is illustrated in FIG. 3B, showing guide post 36 having a single upper flange 36a and a supporting shaft 36*b* with an upper substantially cylindrical portion $36b_1$ and a lower conical-shaped portion $36b_2$. The presence of conical portion $36b_2$ tends to force tape 38 to ride upwardly so that its upper edge is in contact with the lower surface of flange 36*a*. However, such upward force is attributable to the riding of the lower edge of tape 38 against spread conical portion $36b_2$. The existence of the greater diameter for this lower conical portion tends to stretch tape 38 as it curls outwardly toward the lower edge thereof; such stretching of the tape may result in its permanent distortion, leading to a much greater probability of errors in both the write and read cycles.

Figure 4:
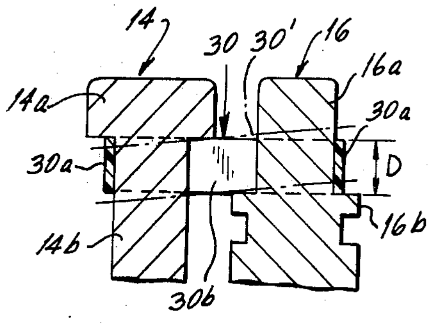
FIG. 4 is an enlarged fragmentary sectional view of one pair of adjacent guide posts in accordance with the present invention, showing a segment of recording tape passing behind both posts in alignment therewith (in solid line), and with an exaggerated deflection (in phantom), taken along the discontinuous section line 4—4 of FIG. 1 in the direction of the arrows.

The tape travel guide post arrangement of the present invention avoids these prior art shortcomings, and a detailed showing of the relationship of tape 30 as it passes by illustrative guide post pair 14, 16 is given in FIG. 4. This drawing figure represents a section view through a portion of first guide post 14 and second guide post 16 along the discontinuous section line 4—4 of FIG. 1 in the direction of the arrows shown therein. The first guide post with which tape 30 comes in contact in its travel from supply reel 12 toward heads 18, 20, is post 14, having upper flange 14a mounted on underlying shaft 14*b*. While tape 30 is generally free to slide in the downward direction along shaft 14*b*, its upward movement is limited by the lower surface of flange 14*a*. Generally, the upper edge of tape 30 will ride against the lower surface of flange 14*a*, as best illustrated at the left of post 14 in FIG. 4. Any tendency for tape 30 to rise upward as it passes post 14 will be resisted by the presence of the lower surface of flange 14*a* which, in effect, acts to slightly urge tape 30 downward along shaft 14*b*.

However, any tendency toward downward motion of tape 30 with respect to guide post 14 is restricted by the second guide post 16 of the pair of guide posts 14, 16. Thus, as is seen in FIG. 4, guide post 16 includes an upper free-standing shaft 16*a* and an underlying flange 16*b*. The lower edge of tape 30 rides on the upper surface of flange 16*b* during tape travel. Thus, any tendency for tape 30 to ride downward along shaft 14*b* is restricted by the presence of adjacent flange 16*b*, which limits the downward movement of tape 30. Any urging of tape 30 upward along shaft 16*a* of post 16 is restricted by contact between the upper edge of tape 30 and the lower surface of flange 14*a* of post 14. It is therefore seen that the two posts 14 and 16 complement each other in restricting the movement of tape 30 in either the upward or downward directions shown in FIG. 4.

With guide posts 14 and 16 adjacent to each other, tape 30 is gently urged downward in the course of its travel from post 14 to post 16. The dimension between the lower surface of flange 14*a* of post 14 and the upper surface of flange 16*b* of post 16, identified as D in FIG. 4, is perhaps a few thousandths of an inch less than the width of the tape 30. For example, where tape 30 has a width of 0.150 inches (+0.000, −0.002), the dimension D in FIG. 4 will be approximately 0.148 inches. For the minimum width of such tape, there will be near perfect alignment with flanges 14*a*, 16*b*. The slight reduction in dimension D as compared to the maximum width of such tape may cause the tape 30 to deflect slightly toward the exaggerated position shown at 30′ in FIG. 4. However, this slight skew will generally be eliminated by the time tape 30 has traveled between post 16 and effective region 18*a* of head 18, or will not be great enough to interfere with either the read or write cycles. The effect of any such skew is rendered negligible by making the distance identified as L between guide post 16 and effective head region 18a sufficiently long that the deflection, if any, associated with tape 30 as it rides along the upper surface of flange 16*b*, will be dissipated by the time the tape arrives at head region 18*a*. For example, the distance L in FIG. 1 may be approximately 1 inch, where the tape is utilized on a tape deck system having a read and write speed of 10 inches per second and rewind and search speeds of 40 inches per second. The distances L′, between head regions 18*a* and 20*a*, and L″, between head region 20*a* and inner guide post 22 of the other pair, are similarly relevant to eliminating the effect of any deflection. Distance L″ will be equal to distance L, while distance L′ may be slightly less, e.g., approximately 0.85 inches. The cumulative total of distances L, L′ and L″ will serve to properly align tape 30 with head regions 18*a* and 20*a*.

When tape tension is present in the system, for example during or prior to tape travel, the tape will be maintained in a relatively taut condition, thus resulting in effective and intimate contact between tape 30 and effective head regions 18*a* and 20*a*. This tensioning of tape 30,together with selecting appropriate distances L, L′ and L″, will serve to maintain tape 30 against and aligned with head portions 18*a* and 20*a* regardless of any deflection which may exist with respect to the lower edge of tape 30 and the upper surface of flange 16.

The same dimensional relationships which have been described above with respect to the pair of guide posts 14, 16, also exist with respect to corresponding pair of guide posts 22, 24, located between read head 20 and friction capstan 26. In this embodiment, in which two pairs of guide posts are used, there should be symmetry between guide post pairs 14, 16 and 22, 24; thus, the geometry of post 22 will be the same as that of post 16, while the geometry of post 24 will be that of post 14. As can be seen from FIG. 2, the lower edge of tape 30 rides on the upper surface of flange 22*b* of post 22, with the tape being essentially free to slide upwards along shaft 22*a* of post 22. However, any such upward movement is restricted by the lower surface of flange 24*a* of post 24, which is adjacent to post 22. The exaggerated skew shown at 30′ in FIG. 4 will be present (with the opposite incline) between posts 24 and 22 during rewind. Both pairs of guide posts 14, 16 and 22, 24 serve, together, to guide tape 30 in its travel between supply reel 12 and take-up reel 28 either in the forward or reverse directions.

The overall guidance effect achieved by guide post pairs 14, 16 and 22, 24 can be considered in terms of an initial and a subsequent adjustment achieved by each post of each pair. Thus, the significant and ultimately controlling posts of the system of the invention, in the embodiment in which a pair of posts is used on each side of the heads, are innermost guide posts 16 and 22. From FIG. 2, it can be appreciated that the controlling upper surfaces of flange 16*b* of post 16 and of flange 22*b* of post 22 are established at a height above the surface of tape deck 10 such that the center of tape 30 will thereby pass across the effective parts of regions 18*a* and 20*a* of heads 18 and 20 respectively. In the forward direction (to the right in FIG. 2), tape 30 will initially contact the lower surface of flange 14*a* of post 14, and will receive an initial vertical adjustment therefrom; however, in passing to heads 18 and 20 in the forward direction, the vertical orientation of tape 30 will be principally controlled by the contact between the lower edge of tape 30 and the upper surface of flange 16*b* of post 16. Similarly, in the reverse direction (i.e., during rewind), the tape 30 will initially be adjusted vertically by contact between its upper edge and the lower surface of flange 24*a* of post 24. However, the controlling vertical adjustment of tape 30 on its travel toward heads 18 and 20 from the right in FIG. 2 will be based upon the contact between the lower edge of tape 30 and the upper surface of flange 22*b* of post 22. Thus, posts 14 and 24 can be considered to establish an initial "coarse" alignment of the vertical position of tape 30 during tape travel; inner posts 16 and 22, however, establish the "fine" control which guarantees the proper alignment of tape 30 with respect to effective head portions 18*a* and 20*a*.

It was noted previously that in the illustrative embodiment utilizing two pairs of guide posts, the arrangement of the posts should be symmetrical in order to be effective to control the vertical alignment of tape 30. This symmetry is demonstrated, of course, in the relative geometry of the posts illustrated in FIG. 2, where inner posts 16 and 22 are identical as are posts 14 and 24. The present invention can also operate effectively to achieve the same result if each outer post has the geometry of posts 16 and 22, while the inner posts have the geometry of posts 14 and 24. In that event, the inner posts (i.e., those closest to the heads) will still be the controlling ones with respect to the vertical orientation of tape 30. However, the ultimate controlling alignment surface will then be the lower surface of the upper flange of each inner post, which will have a T-shaped cross-sectional appearance such as is illustrated with respect to posts 14 and 24 in FIG. 2. Also in that case, the outer posts, having the geometry of present inner posts 16 and 22, will provide the initial coarse alignment between the bottom edge of tape 30 and the upper surface of their lower flanges, with the fine adjustment referred to above being made by the inner posts and the lower surfaces of their respective upper flanges.

An alternate embodiment of the present invention utilizes one pair of complementing guide posts on one side of the heads, while employing a single fixed guide post, with both upper and lower flanges, on the other side of the heads. For example, referring to FIGS. 1 and 2, the alternate embodiment will still employ guide posts 14 and 16 in the same manner and position as there indicated. However, guide posts 22 and 24, between the heads 18, 20 and capstan 26, will be replaced by a single guide post having a configuration substantially identical to that of guide post 32 shown in FIG. 3A. In this alternate embodiment, however, the distance between the upper and lower flanges of the single guide post is arranged to be slightly greater than the width of the tape, thereby accommodating any slight skew caused by the alignment effected by the guide posts 14, 16 as explained above (e.g., see skew position 30' of the tape in FIG. 4).

The utilization of a single fixed guide post in place of guide posts 22, 24 is permissible because of the alignment control achieved by guide post pair 14, 16, together with the tension forces applied to the tape by the drive motors for supply reel 12, take-up reel 28 and friction capstan 26. The spring-like action referred to above still occurs in this embodiment, although here it is based upon the guiding action of flange 14a and of the upper flange of the single guide post to the right of the heads, together with the tape tension. In this embodiment, therefore, the upper flange of the single fixed post provides the "fine" alignment of the tape with the "coarse" alignment being provided by the upper flange of guide post 14. In considering this embodiment, it is also relevant to note that the alignment control furnished by guide post pair 14, 16 is slightly more critical with respect to the read and write functions than is the control furnished by any guide post positioned to the right of the heads — thus, the control furnished by the right-hand posts is principally effective during the rewind and search cycles, and alignment of the tape with the heads is not as critical during such cycles as it is during the read and write cycles.

It should also be appreciated that the present invention can be utilized with media other than magnetic recording tape, for example film or paper tape, which are also capable of carrying information or images as is well known. Moreover, the invention is also adapted for use in other tape handling systems.

It is to be understood that the foregoing description is merely illustrative of the application of the principles of the invention. Numerous other embodiments may be devised by those skilled in the art without departing from the spirit and scope of the invention.

What is claimed is:

1. In a tape deck system for operating on recording tape, supply means for storing and providing said tape to said system, take-up means for receiving said tape from said supply means during the operation of said system, drive means for governing the movement of said tape between said supply and said take-up means, means disposed in the travel path of said tape for operating on said tape, and guiding means for aligning said tape with respect to said operating means in said travel path between said supply and said take-up means, said guiding means including at least one pair of guide posts disposed adjacent to each other in said tape travel path between one of said supply means and said take-up means, and said operating means, each of said guide posts having a guide surface for engaging the sides of said tape and one guiding flange in contact with one edge of said tape, said guiding flange of a first of said guide posts defines a guide surface for one edge of said tape and said guiding flange of the second of said guide posts defines a guide surface for the opposite edge of said tape said guiding flanges of said first and second guide posts having edge portions in substantially vertical alignment thereby providing a pivotal action on said tape by said edges and the distance between said guide surfaces as measured transverse to the direction of said tape travel is no more than the minimum width of said tape.

2. A tape deck system as defined in claim 1 wherein said at least one pair of guide posts is disposed between said supply means and said operating means.

3. A tape deck system as defined in claim 1 wherein said at least one pair of guide posts is disposed between said operating means and said take-up means.

4. A tape deck system as defined in claim 1 wherein said operating means includes at least one recording head.

5. A tape deck as defined in claim 1 wherein the selected distance along said tape travel path between the one of said guide posts closest to said operating means, and said operating means, is sufficient to preclude the effect of any skew resulting from said tape riding on said guide surfaces.

6. A tape deck system as defined in claim 5 wherein said operating means includes a write head and a read head, said selected distance being defined between said one of said guide posts and one of said write and read heads closest to said one guide post and wherein the separation distance between said write and read heads further inhibits said skew effect.

7. A tape deck system as defined in claim 1 wherein a first pair of said guide posts is disposed along said tape travel path between said supply means and said operating means, and a second pair of said guide posts is disposed along said tape travel path between said operating means and said take-up means.

8. A tape deck system as defined in claim 7 wherein the configurations of said guide posts of each of said pairs disposed closest to said operating means are substantially identical, and the configurations of said guide posts of each of said pairs disposed remote from said operating means are substantially identical.

9. A tape deck system as defined in claim 8 wherein each of said guide posts closest to said operating means includes a base portion, said guiding flange thereof being mounted on said base portion to define said guide surface for one edge of said tape, and a shaft portion mounted on said flange, and wherein each of said guide posts remote from said operating means includes a main shaft, said guiding flange thereof being mounted on said main shaft to define said guide surface for the opposite edge of said tape.

10. A tape deck system as defined in claim 9 wherein said shaft portions and said main shafts of said guide posts establish riding surfaces for only one surface of said tape.

11. A tape deck system as defined in claim 8 wherein said guiding flanges of each of said first and second pairs of guide posts define respective pairs of guide surfaces for opposite edges of said tape, and wherein said guide surfaces of each of said pairs of guide posts are separated in a direction transverse to tape movement by a distance no greater than the minimum width of said tape.

12. A tape deck system as defined in claim 11 wherein the selected distance along said tape travel path between each of said guide posts of said first and said second pairs closest to said operating means, and said operating means, is sufficient to preclude the effect of any skew resulting from said tape riding on said guide surfaces.

13. A tape deck system as defined in claim 12 wherein said operating means includes a write head and a read head, said selected distance being defined between said each of said closest guide posts and said write and read heads respectively, and wherein the separation distance between said write and read heads further inhibits said skew effect.

14. A tape deck system as defined in claim 1 including in addition a single guide post disposed along said tape travel path on the opposite side of said operating means from said at least one pair of guide posts.

* * * * *